United States Patent [19]

Labedan

[11] Patent Number: 5,413,417
[45] Date of Patent: May 9, 1995

[54] PRESTRESSED ROLLING BEARING WITH IMPROVED CAGE AND ITS APPLICATION PARTICULARLY TO A STEERING COLUMN

[75] Inventor: Jean-Denis Labedan, Bourges, France

[73] Assignee: Nadella, Vierzon Cedex, France

[21] Appl. No.: 194,155

[22] Filed: Feb. 9, 1994

[30] Foreign Application Priority Data

Apr. 14, 1993 [FR] France .................. 93 04385

[51] Int. Cl.⁶ .................. F16C 33/48; B62D 1/18
[52] U.S. Cl. ..................... 384/572; 74/492; 280/777; 384/624
[58] Field of Search ............ 384/523, 526, 572, 576, 384/624; 74/492; 280/777; 180/78

[56] References Cited

U.S. PATENT DOCUMENTS

| | | | |
|---|---|---|---|
| 3,835,725 | 9/1974 | Furusho et al. | 74/492 |
| 4,406,176 | 9/1983 | Numazawa et al. | 74/492 |
| 4,445,708 | 5/1984 | Oakes et al. | 280/777 |
| 4,541,742 | 9/1985 | Lederman | 384/518 |
| 4,805,478 | 2/1989 | Beauch | 74/492 |
| 5,044,788 | 9/1991 | Murphy et al. | 384/572 X |

FOREIGN PATENT DOCUMENTS

| | | | |
|---|---|---|---|
| 2193443 | 2/1974 | France . | |
| 2586069 | 2/1987 | France . | |
| 2659404 | 9/1991 | France . | |
| 2668442 | 4/1992 | France | 280/777 |
| 1066815 | 10/1959 | Germany . | |
| 2318341 | 10/1974 | Germany . | |

*Primary Examiner*—Thomas R. Hannon
*Attorney, Agent, or Firm*—Wenderoth, Lind & Ponack

[57] ABSTRACT

The bearing, intended to be interposed between a shaft with a median neck bordered by two ends, one of which is capped by a sleeve capable of sliding axially, and a support, includes an inner race, an outer race, a retaining ring, rolling members and a cage. At least one edge of the cage is provided with a resting element. The neck includes an abutment element such as a ramp to normally to hold the case axially fixed. Axial sliding of the cage is enabled after deformation of the resting element when the sleeve encounters particularly the cage.

17 Claims, 3 Drawing Sheets

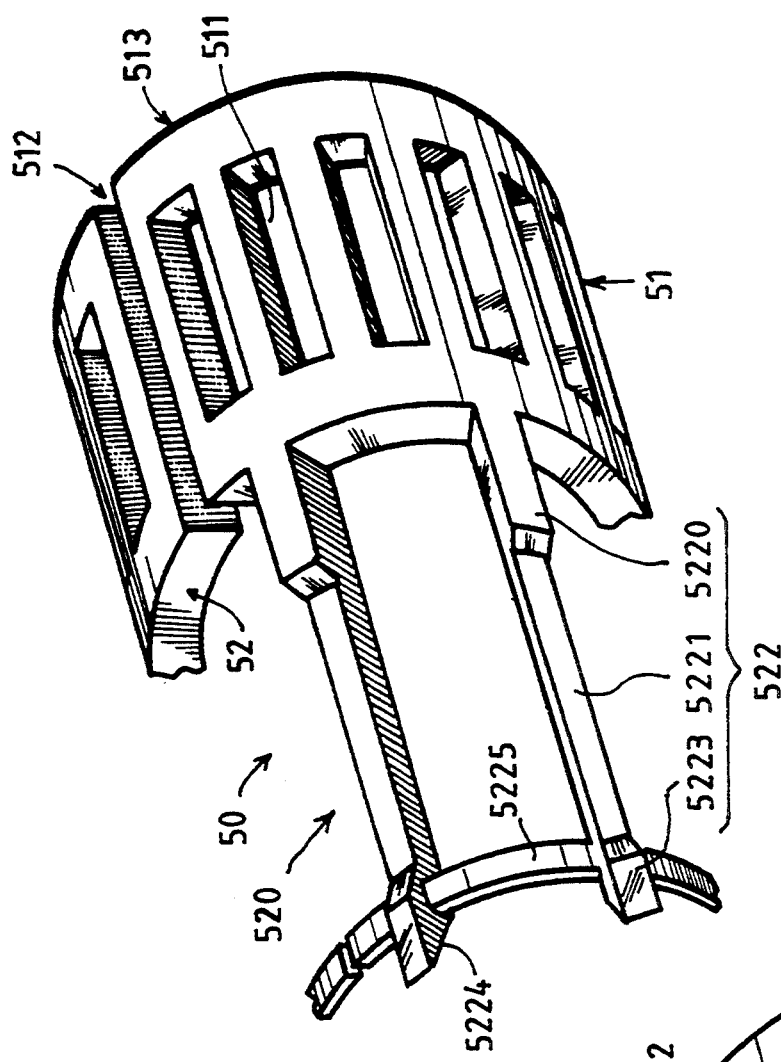
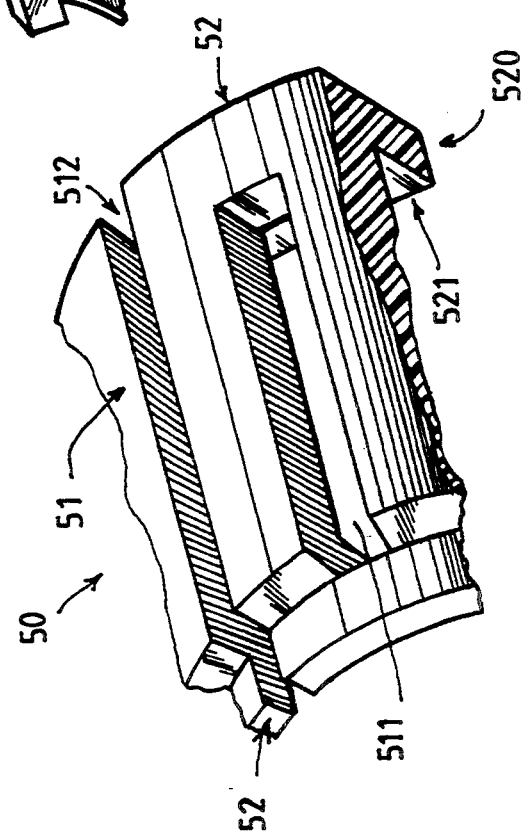
FIG.1
FIG.2

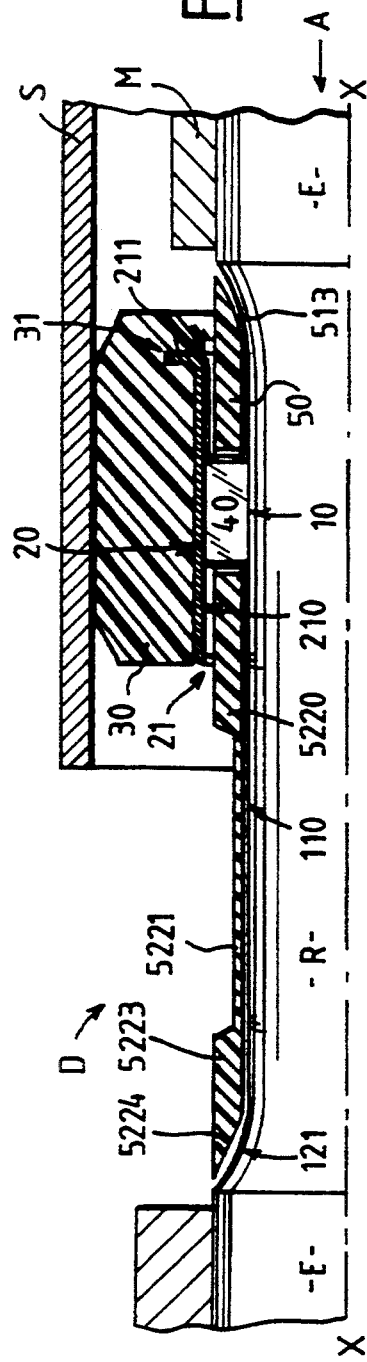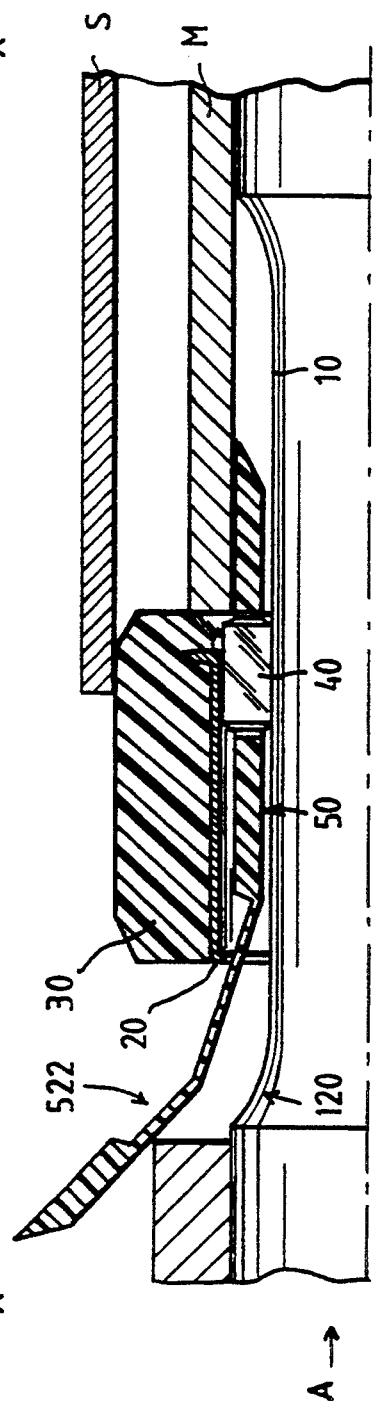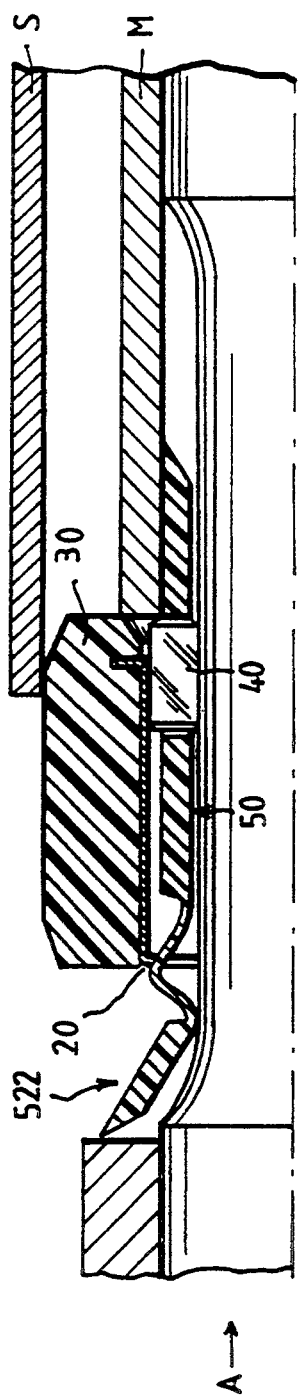

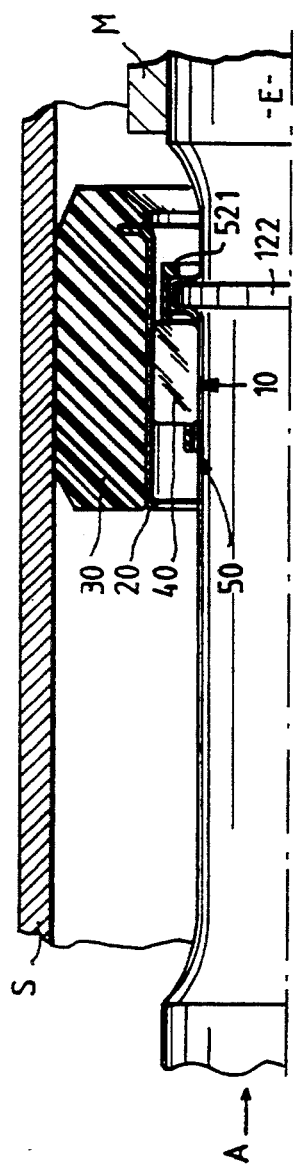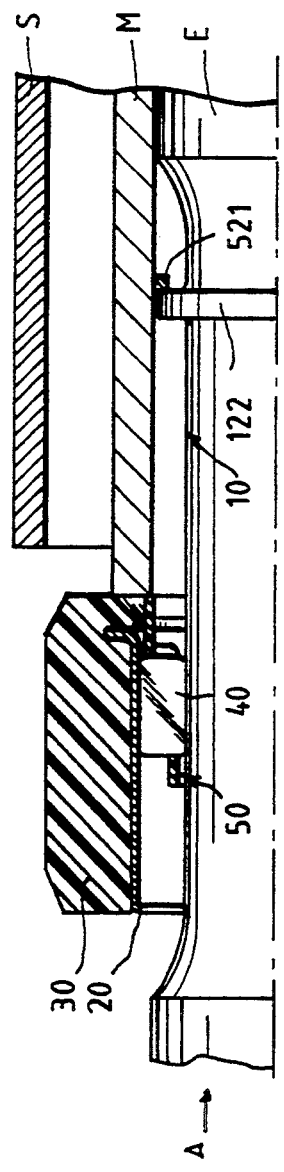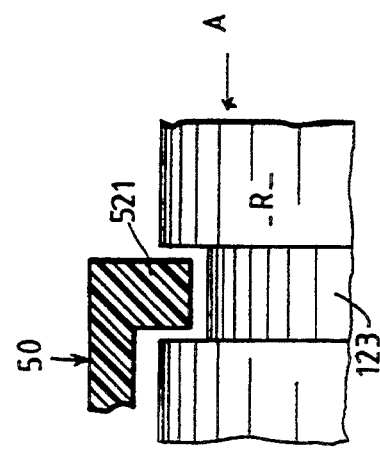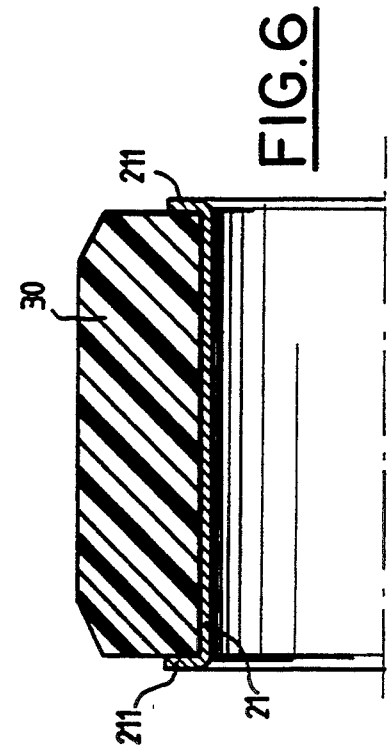

PRESTRESSED ROLLING BEARING WITH IMPROVED CAGE AND ITS APPLICATION PARTICULARLY TO A STEERING COLUMN

BACKGROUND OF THE INVENTION

The present invention relates to dislocatable prestressed rolling bearings and, particularly to use thereof for mounting land-going motor vehicle steering columns.

The invention relates to rolling bearings intended to provide the connection between a shaft and a support so that, besides a degree of freedom in relative rotation between shaft and support being possible, a certain degree of freedom in relative axial translation between shaft and support might also be possible under certain completely exceptional circumstances. The invention also relates to the application of such a rolling bearing to the steering columns particularly of land-going motor vehicles.

In numerous industrial fields, it is necessary to be able to mount a shaft on at least one support so that such shaft and such support can normally turn in relative rotation about their common axis without thereby being able to move translationally along this axis, except for extreme exceptional circumstances.

Such a situation is encountered, for example, in the motor industry, for mounting steering columns of a type which are capable of disconnecting or otherwise deforming, for example by compression or retraction, so that they do not project into the passenger compartment in the event of violent impacts with a significant axial longitudinal component, referenced with respect to the vehicle, so as not to endanger the life of the driver.

As is known, conventionally a steering column is composed of a support, column sheath or tube, which is fixed to the driving position of the vehicle through the use of fittings, gusset plates or the like, connected to the structure or shell. Such a steering column is also composed of an actual shaft, often in several sections which, through use of the steering wheel, transmits steering instructions from the driver to the wheels of the vehicle by the interposition of a steering box and steering gear. The shaft is mounted, at least partially, in the support, sheath or tube, with the aid of rolling bearings, most often roller or needle bearings, so as normally to allow just one degree of freedom of movement in relative rotation about the common axis of the shaft and of the support, sheath or tube, to the exclusion of any other degree of freedom of movement, such as an axial translation, except, for example, in the event of a frontal impact or an impact with a large longitudinal component, referenced with respect to the conventional longitudinal axis of the vehicle, this impact exceeding a determined threshold of the order of 250 daN.

Such a subassembly which effectively participates in passive safety must be reliable, satisfy strict and sometimes apparently contradictory standards, while remaining of modest cost.

Such a steering column must, for example:
be free of any play, without the slightest pinching or interference that would prevent relative displacement;
allow rotation with a torque which does not exceed 0.06 Nm, for example;
have wear durability which conventionally corresponds at least to the average anticipated life of the vehicle;
resist radial compressive stresses which may arise during attempts at a break-in when the steering lock is engaged, under the action of a torque of 250 Nm;
be strong, by virtue of its rigidity, with a displacement which does not exceed 0.2 mm under a load of 2.5 daN transmitted by the steering wheel;
under normal operation, resist any longitudinal translation of the shaft with respect to the support, by sliding;
and, however, give longitudinally and or disconnect under axial loads exceeding a prefixed limit so as to contribute to the safety of the driver so that the latter is not injured or bruised following violent contact with the steering wheel on the occasion of a hard impact or collision.

This brief, non-exhaustive, list illustrates how difficult it is to satisfy all these technical specifications taking into account the economic requirements which have to be faced.

A solution usually utilized for solving this type of difficulty consists in making use of very particular ball- or roller- or needle-rolling bearings which are very different from rolling bearings with a circular, conical or spherical raceway. In fact, the rolling bearings used for this type of application have, for example, polygonal, often triangular, raceways or races. These bearings make it possible to compensate for the variations in dimensions resulting from manufacturing tolerances between support, tube or sheath and shaft while ensuring the total absence of play.

Solutions are, for example, illustrated by FR 2,193,443 and FR 2,586,069 to which reference may usefully be made. These solutions are not, however, totally satisfactory, because they require relatively numerous constituent parts and relatively complex multiple mounting operations, and all adversely impacting costs.

SUMMARY OF THE INVENTION

The object of the invention is to provide a rolling bearing for mounting a shaft on a support, particularly a land-going motor vehicle steering column, so that just one degree of freedom of movement in relative rotation between shaft and support is normally possible but which, however, allows a certain axial displacement of the order of approximately ten millimeters under an axial load which does not exceed a prefixed limit of the order of 150 N. Such axial displacement is by collapse or axial dislocation of the rolling bearing so as not to prevent the steering column from giving on the occasion of the threshold predetermined as regards safety being exceeded. Such rolling bearing, although of modest mounting and manufacturing cost, makes it possible to satisfy most of the technical specifications mentioned above.

The invention provides a prestressed rolling bearing with an improved cage, which bearing is intended to be interposed between a shaft with a median neck bordered by two ends, one of which is capped by a sleeve capable of sliding axially when it is subjected to a load which exceeds a predetermined threshold, and a support which is coaxial with the shaft. The bearing includes an inner race associated with the shaft, an outer race associated with the support, a retaining ring exerting a centripetal radial stress on the outer race, rolling members interposed between the inner and outer races on which they run, and a cage with a body having therethrough openings or cells for retaining the rolling members and with two opposite edges which terminate the body. At least one of the edges of the body of the cage is provided with a resting element. The neck is equipped with an abutment element intended to interact with the resting element so as normally to contribute to holding in place the cage fixed axially relative to the shaft, but to allow an axial sliding of the cage after deformation of the resting element when the sleeve encounters particularly the cage following an axial load which is at least equal to a prefixed limit below the predetermined threshold.

The invention also provides such rolling bearing applied particularly to a steering column of a motor vehicle, for example a land-going motor vehicle.

BRIEF DESCRIPTION OF THE DRAWINGS

Other features of the invention will be apparent from the description and the claims which follow, as well as from examining the drawings, given solely by way of example and in which:

FIG. 1 is a partial perspective view of one embodiment of a constituent part of a rolling bearing according to the invention;

FIG. 2 is a view similar to that of FIG. 1 but of another embodiment of this constituent part;

FIGS. 3A, 3B and 3C are longitudinal meridian half-sections of a rolling bearing according to the invention applied to a motor vehicle steering column of any known type, using the constituent part illustrated in FIG. 1 and shown in a normal state in FIG. 3A and in an exceptional dislocated state in FIGS. 3B and 3C;

FIGS. 4A and 4B are views similar to those illustrated in FIGS. 3A-3C in which the rolling bearing according to the invention is equipped with the constituent part illustrated in FIG. 2, FIG. 4A corresponding to the normal state and FIG. 4B to the exceptional dislocated state;

FIG. 5 is a partial detailed view of a variation of the embodiment of FIGS. 2 and 4A-4B; and FIG. 6 is a partial section illustrating a further variation of the invention.

DETAILED DESCRIPTION OF THE INVENTION

Since rolling bearings in general, on the one hand, and steering columns of motor vehicles, particularly land-going ones, on the other hand, are well known in the art, only that structure which directly or indirectly relates to the invention will be described in the following. For the rest, the person skilled in the art of the technical field in question will delve into current conventional solutions at his or her disposal in order to confront the particular problems with which he or she is faced.

In that which follows, one and the same reference numeral will always be used to identify a similar element, regardless of the embodiment or its variant.

For convenience of description, each of the constituent parts of a rolling bearing according to the invention will be described in succession, before explaining the manufacture, mounting and operation thereof.

The prestressed rolling bearing with improved cage according to the invention will be described in its specific application to a steering column of a motor vehicle, particularly a land-going motor vehicle, but it is clear that the bearing according to the invention is not limited to this specific application.

As seen particularly in FIGS. 3A-3C, a motor vehicle steering column D is essentially composed of a support S and of a shaft A which are coaxial. The support S which is like a sheath or a tube or the like is fixed to a structure or shell, not shown, of a driving position with the aid of fittings, gusset plates or the like. A steering wheel, fixed to one of the extremities of the shaft A is intended to make it turn about the common axis X—X without shaft A normally in any way being able to slide by translation along this axis, except for completely exceptional circumstances as will be discussed below.

In order to achieve this, at least one rolling bearing according to the invention is interposed between shaft A and support S.

As is seen, a prestressed rolling bearing according to the invention comprises, particularly, an inner race 10, an outer race 20, a retaining ring 30, rolling members 40 and a cage 50.

Such rolling bearing is more particularly intended to be associated with a shaft, preferably in several sections and, in particular, with that one of such sections which provides a safety function owing to its tendency to deform or to break for example by sliding, dislocating, buckling, breaking in shear or in torsion. Such shaft section, of any known type, for example has a median neck R bordered by two ends E preferably with non-circular cross-section, for example with two opposing parallel flats. At least one of these two ends E is capped by a sleeve M which is normally rendered integral with the end which carries it so that it can neither turn nor slide axially with respect to it and so that it can, however, slide axially when it is subjected to a load exceeding a predetermined threshold, conventionally chosen to be of the order of 250 daN for safety reasons as will be understood later. This breakable link between end E and sleeve M is, for example, provided with the aid of an injected synthetic resin providing a link capable of breaking in shear when the predetermined threshold is exceeded. This is conventional.

Preferably, the neck R has an outside surface 110 which has been suitably machined and treated at least locally to be used as inner race 10. The neck R is equipped with an abutment element 120 the role of which will be made apparent below. This abutment element is, for example, a ramp 121 at at least one of the junctions of the neck R and of one of the ends E, or equally can be a projecting rib 122 (FIGS. 4A-4B) or a set back groove 123 (FIG 5).

The outer race 20 is, for example, formed on the inside surface 210 of a bushing 21, for example made from thin sheet metal which has been stamped and treated conventionally. The cross-section of this bush is preferably polygonal, and for example a curved equilateral triangle. This bushing may also be slit.

As is seen, at least one of the extremities of the bushing 21 preferably has a continuous or non-continuous centrifugal radial lip 211.

The retaining ring 30 is intended to exert a centripetal radial stress or prestress on the outer race 20. As is seen, this retaining ring 30 is interposed between the outer race 20 and the support S of the shaft A. Retaining ring 30 is preferably made from an elastomeric synthetic material of appropriate Shore hardness. This is well known in the art. The retaining ring 30 has, if required, one or more cuts 31 intended to receive the lip or lips 211 of the bushing 21 which defines the outer race 20 on its inside surface 210. When two lips 211 are used, it is also possible to provide that such lips enframe the end flanks of the retaining ring, which they then grip, as shown in FIG. 6.

The rolling members 40 are interposed between the two races 10 and 20 on which they run. The rolling members 40 are preferably rollers or needles.

The cage 50 has a body 51 which has therethrough openings, slots or cells 511 for retaining the rolling members 40. A longitudinal peripheral slit 512 cuts the body 51 to facilitate mounting. Body 51 can have a chamfer 513 pointing towards the shaft (FIGS. 3A–3C), or the cage 50 terminated by two opposite edges 52 (FIG. 2). At least one end, e.g. one of these two edges 52, is provided with a resting element 520 intended to interact with the abutment element 120 of the neck.

The interaction between the abutment element 120 of the neck and the resting element 520 of the cage acts normally to hold and/or contribute to holding in place the cage fixed axially relative particularly to the shaft. However, such interaction also allows axial sliding of the cage relative particularly to the shaft under exceptionally extreme circumstances after deformation of the resting element 520, when the sleeve encounters particularly the cage or bush following a load at least equal to the predetermined threshold.

As illustrated in FIGS. 2, 4A and 5, the resting element 520 of the cage 50 may be, for example, a circumferentially continuous or discontinuous centripetal radial flange 521. Flange 521 is normally placed close to or in contact with the rib 121 or with the groove 122. As will be understood, flange 521 is capable of breaking and/or of deforming. The resting element 520 may also be in the form of at least one longitudinal tab 522. FIG. 1 shows plural such tabs each including a base 5220 connected to the edge 52 of the cage 50, a relatively thin strip 5221 extending the base 5220 and a terminal bulge 5223 at the end of the strip 5221. Preferably, each bulge 5223 is equipped with a bevel 5224 which normally faces the ramp 121. If necessary, the bulges 5224 are connected by a deformable hoop 5225 which is, for example, open, breakable and/or extensible. As will be understood, the strips 5221 are capable of deforming, for example bending or crumpling.

The cage is preferably made from a synthetic material formed into shape by molding, for example by injection molding, as is conventional.

All the constituent parts of a rolling bearing according to the invention are joined together, assembled and mounted as the drawings.

The operation of a rolling bearing according to the invention will now be described.

In the initial state, in the normal operating position, a rolling bearing according to the invention is situated as illustrated in FIGS. 3A, 4A and 5. In such a configuration, the abutment element of the neck and the resting element of the cage are in mutual contact and hold the rolling members in a fixed longitudinal position relative to their two races and, in particular, with respect to the inner race associated with the shaft. In the present context, relatively fixed axially is understood to mean a clearance of a few tenths of millimeters and, preferably, not exceeding approximately one millimeter, for example.

If a violent impact now occurs with an axial longitudinal component which is greater than the predetermined threshold, for example of the order of 250 daN,
the sleeve M connected to the end E of the section of shaft A, as indicated previously, separates from the latter. The sleeve by sliding, encounters particularly the cage or the bushing of the rolling bearing as illustrated. The sleeve, in moving, pushes for example the retaining ring and then the rolling members and/or the cage.

As then seen in FIGS. 3B and 3C, the resting element then escapes from the abutment element, by passing over it or by being crushed directly against the latter or indirectly against a component which is connected to it. Indeed, in this embodiment, the strips behave like independent deformable beams.

In the other embodiment, under the effect of the thrust of the sleeve, the flange-shaped resting element breaks as illustrated in FIG. 4B, or escapes from the rib 122 or from the groove 123 by elastic or inelastic deformation.

The dislocation of the rolling bearing according to the invention takes place for an axial load which exceeds a prefixed limit below the predetermined threshold.

Preferably the dislocation of collapse of the rolling bearing takes place with an axial load of the order of 150 N which is distinctly below the usually chosen limit of 250 daN for disjointing a so-called safety steering column.

As may be observed, the presence of a rib or of a groove which is radially set back with respect to at least one of the ends in no way disturbs the sliding of the sleeve. Such ribs or grooves may easily be obtained for example by turning the section of shaft, observing, however, that the case of the groove is not, in principle, favorable in the case where the length of the shaft in question contributes to safety by operating in torsion.

The foregoing clearly elucidates the benefit of the invention and the advantages which it offers in particular for the proposed application.

I claim:

1. A prestressed rolling bearing interposed between a shaft with a median neck bordered by two ends one of which is capped by a sleeve capable of sliding axially when it is subjected to a load which exceeds a predetermined threshold and a support, said bearing comprising:
   an inner race associated with the shaft;
   an outer race associated with the support;
   a retaining ring exerting a centripetal radial stress on said outer race;
   rolling members interposed between and running on said inner and outer races;
   a case including a body having cells retaining said rolling members;
   said body having two opposite terminating edges; and
   at least one of said edges having a resting element, and the neck being equipped with an abutment element interacting with said resting element to normally contribute to holding in place said cage fixed axially relative to the shaft and to allow an axial sliding of said cage upon deformation of said resting element when the sleeve encounters said cage following an axial load which is at least equal to a prefixed limit below the predetermined threshold.

2. A bearing as claimed in claim 1, wherein said abutment element is a rib between the shaft ends, and said resting element is a centripetal radial flange normally in contact with said rib.

3. A bearing as claimed in claim 1, wherein said abutment element is a groove between the shaft ends, and said resting element is a centripetal radial flange normally extending into said groove.

4. A bearing as claimed in claim 1, wherein said resting element is at least one longitudinal tab including a base connected to said at least one edge, a strip extending said base and a terminal bulge at an end of said strip, and said abutment element is a ramp at a junction of the neck and of one of the shaft ends.

5. A bearing as claimed in claim 4, wherein said bulge includes a bevel normally facing the ramp.

6. A bearing as claimed in claim 4, comprising plural tabs the bulges of which are connected by a hoop.

7. A bearing as claimed in claim 4, wherein the other said edge of said body is provided with a chamfer directed towards the shaft.

8. A bearing as claimed in claim 1, wherein said cage is provided with a longitudinal peripheral slit.

9. A bearing as claimed in claim 1, wherein said cage is made from a molded synthetic material.

10. A bearing as claimed in claim 1, wherein said outer race is an inside surface of a thin bushing.

11. A bearing as claimed in claim 10, wherein said bushing has a polygonal cross sectional profile.

12. A bearing as claimed in claim 10, wherein said bushing has a centrifugal radial lip at at least one axial end thereof, and said retaining ring has a recess receiving said lip.

13. A bearing as claimed in claim 10, wherein said bushing has at opposite axial ends thereof centrifugal radial lips enframing opposite end flanks of said retaining ring.

14. A bearing as claimed in claim 1, wherein said retaining ring is made from an elastomeric material.

15. A bearing as claimed in claim 1, wherein said rolling members are needles.

16. A bearing as claimed in claim 1, wherein said inner race comprises a cylindrical outside surface of the median neck.

17. An assembly comprising a bearing as claimed in claim 1, applied to a land-going motor vehicle steering column.

* * * * *